US012605952B2

(12) United States Patent
Tian et al.

(10) Patent No.: US 12,605,952 B2
(45) Date of Patent: Apr. 21, 2026

(54) PRINTER DEVICE AND METHOD OF USING THE SAME

(71) Applicant: Hand Held Products, Inc., Charlotte, NC (US)

(72) Inventors: Hang Tian, Charlotte, NC (US); Longchao Zhao, Charlotte, NC (US); Jian Zeng, Charlotte, NC (US); Xiaojun Ma, Charlotte, NC (US); Ximing Luo, Charlotte, NC (US); Lei Zheng, Charlotte, NC (US); Shuangxi Yu, Charlotte, NC (US); Chuanqing Zeng, Charlotte, NC (US); Jiangxin Fan, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 139 days.

(21) Appl. No.: 18/405,597

(22) Filed: Jan. 5, 2024

(65) Prior Publication Data

US 2024/0246346 A1 Jul. 25, 2024

(30) Foreign Application Priority Data

Jan. 19, 2023 (CN) ........................ 202310088022.7

(51) Int. Cl.
*B41J 29/02* (2006.01)
*B41J 29/13* (2006.01)

(52) U.S. Cl.
CPC .................................... *B41J 29/13* (2013.01)

(58) Field of Classification Search
CPC ..... B41J 3/4075; B41J 3/36; B41J 3/39; B41J 29/13; B41J 29/02; B41J 15/042
See application file for complete search history.

(56) References Cited

U.S. PATENT DOCUMENTS 8,500,351 B2 8/2013 Colonel et al.
10,286,694 B2 5/2019 d'Armancourt
(Continued)

FOREIGN PATENT DOCUMENTS

JP 2001-310844 A 11/2001

OTHER PUBLICATIONS

Extended European Search Report Mailed on May 2, 2024 for EP Application No. 23216849, 8 page(s).

*Primary Examiner* — Scott A Richmond
(74) *Attorney, Agent, or Firm* — Alston & Bird LLP

(57) ABSTRACT

Various embodiments are directed to printer devices and methods of using the same. In various embodiments, a printer device may comprise a printer housing defining an interior portion for housing a plurality of internal components, the printer housing being selectively configurable in an open configuration, wherein the printer housing comprises: a bottom housing portion; and a top housing portion hingedly connected to the bottom housing portion and configured to rotate relative to the bottom housing portion about a hinge axis to configure the printer housing between the closed and open configurations; wherein the plurality of internal components comprises a first component operatively secured to the bottom housing portion; and a second component defining a media support assembly operatively secured to the top housing portion and configured to move relative to the first component as the top housing portion rotates relative to the bottom housing portion.

19 Claims, 7 Drawing Sheets

(56) References Cited

U.S. PATENT DOCUMENTS

| | | | | |
|---|---|---|---|---|
| 2012/0155946 | A1* | 6/2012 | Colonel | B41J 11/0025 400/691 |
| 2013/0294806 | A1 | 11/2013 | Colonel et al. | |
| 2021/0060989 | A1* | 3/2021 | Hagstrom | A21D 13/24 |

* cited by examiner

PRINTER DEVICE AND METHOD OF USING THE SAME

CROSS-REFERENCE TO RELATED APPLICATIONS

This application claims priority pursuant to 35 U.S.C. 119(a) to Chinese application Ser. No. 202310088022.7, filed Jan. 19, 2023, which application is incorporated herein by reference in its entirety.

FIELD OF THE INVENTION

Various embodiments described herein relate generally to printers, and, more particularly, to printer devices configured to execute one or more printing operations using a print media stored within a printer housing of the device.

BACKGROUND

Applicant has identified many technical challenges and difficulties corresponding to printer devices having housings that are selectively configurable between a closed configuration and an open configuration to facilitate operation of the printer device and provide selective access to an interior portion defined within the printer housing. Through applied effort, ingenuity, and innovation, Applicant has solved problems related to printer devices by developing solutions embodied in the present disclosure, which are described in detail below.

BRIEF SUMMARY

Various embodiments are directed to printer devices and methods of using the same. In various embodiments, a printer device may comprise a printer housing defining an interior portion configured for housing a plurality of internal printer components therein, the printer housing being selectively configurable in an open configuration to facilitate access to at least a portion of the one or more internal printer components, wherein the printer housing comprises: a bottom housing portion; and a top housing portion hingedly connected to the bottom housing portion via one or more hinge elements, the top housing portion being configured to rotate relative to the bottom housing portion about a hinge axis defined by the one or more hinge elements to selectively configure the printer housing between the closed configuration and the open configuration; wherein the plurality of internal printer components comprises a first internal printer component operatively secured to the bottom housing portion; and wherein the plurality of internal printer components further comprises a second internal printer component operatively secured to the top housing portion such that the second internal printer component is moved relative to the first internal component as the top housing portion rotates relative to the bottom housing portion, the second internal printer component defining a media support assembly configured to receive a media supply to at least partially define an arrangement of the media supply within the printer housing.

In various embodiments, the closed configuration of the printer housing may be defined at least in part by a lower boundary edge of the top housing portion engaging an upper boundary edge of the bottom housing portion such that the top housing portion is positioned on top of the bottom housing portion. In certain embodiments, the open configuration of the printer housing may be defined at least in part by the lower boundary edge of the top housing portion being disengaged from the upper boundary edge of the bottom housing portion and positioned such that both the lower boundary edge and the upper boundary edge are arranged to face in an at least partially upward vertical direction. In various embodiments, upon the printer housing being arranged in the closed configuration, the top housing portion and the bottom housing portion may define an at least partially vertically stacked configuration relative to one another. In certain embodiments, the at least partially vertically stacked configuration defined by the top housing portion and the bottom housing portion may be defined at least in part by the second internal printer component operatively secured to the top housing portion being positioned in vertically overlapping position relative to at least a portion of the first internal printer component operatively secured relative to the bottom housing portion. In various embodiments, the closed configuration of the printer housing may be further defined by a first rear surface of the top housing portion and a second rear surface of the bottom housing portion being arranged in an at least substantially coplanar configuration to collectively define an at least substantially vertical rear face of the printer housing.

In various embodiments, the plurality of internal printer components may further include a third internal printer operatively secured to the top housing portion, the third internal printer component defining an internal user interface. In various embodiments, the open configuration of the printer housing may be defined at least in part by an engagement of a first rear surface of the top housing portion with a second rear surface of the bottom housing portion. In certain embodiments, the engagement of the first rear surface of the top housing portion with the second rear surface of the bottom housing portion may be defined by the first rear surface physically contacting the second rear surface at a contact surface area to define an interface between the top housing portion and the bottom housing portion. In various embodiments, the open configuration of the printer housing may be defined at least in part by the top housing portion being arranged in a vertically inverted arrangement. In various embodiments, the open configuration of the printer housing may be defined at least in part by the top housing portion being arranged in a side-by-side arrangement relative to the bottom housing portion. In various embodiments, the open configuration of the printer housing may be further defined by a top surface of the top housing portion being arranged in an at least substantially coplanar configuration relative to a bottom surface of the bottom housing portion.

In various embodiments, the printer device may further comprise one or more fastener elements disposed about the printer housing and configured to facilitate a retention of the top housing portion in the open position in order to maintain the printer housing in the open configuration. In certain embodiments, the one or more fastener elements may include a first fastener element provided at a first rear surface of the top housing portion and a second fastener element provided at a second rear surface of the bottom housing portion, and wherein the first fastener element is configured for engagement with the second fastener element when the top housing portion is provided in the open position. In certain embodiments, the first fastener element and the second fastener element may embody corresponding magnet components configured to define an attraction force therebetween to facilitate the retention of the top housing portion in the open position.

In various embodiments, the top housing portion may be configured to rotate about the hinge axis between a closed position and an open position, wherein the closed configuration of the printer housing is defined at least in part by the top housing portion being arranged in the closed position, and wherein the open configuration of the printer housing is defined at least in part by the top housing portion being arranged in the open position. In certain embodiments, the top housing portion may define a range of relative rotational motion with respect to the bottom housing portion, the range of relative rotational motion being defined between the closed position and the open position. In certain embodiments, the range of relative rotational motion may be defined by an angle of rotation of at least substantially 180 degrees. In various embodiments, the first internal printer component operably secured relative to the bottom housing portion of the printer housing may define a chassis. In various embodiments, the printer device may further comprise a ribbon assembly, wherein at least a portion of the ribbon assembly is attached to the chassis such that the chassis is configured to arrange the at least a portion of the ribbon assembly connected thereto within the printer housing.

BRIEF DESCRIPTION OF THE DRAWINGS

Reference will now be made to the accompanying drawings, which are not necessarily drawn to scale, and wherein.

DETAILED DESCRIPTION

Figure 1:
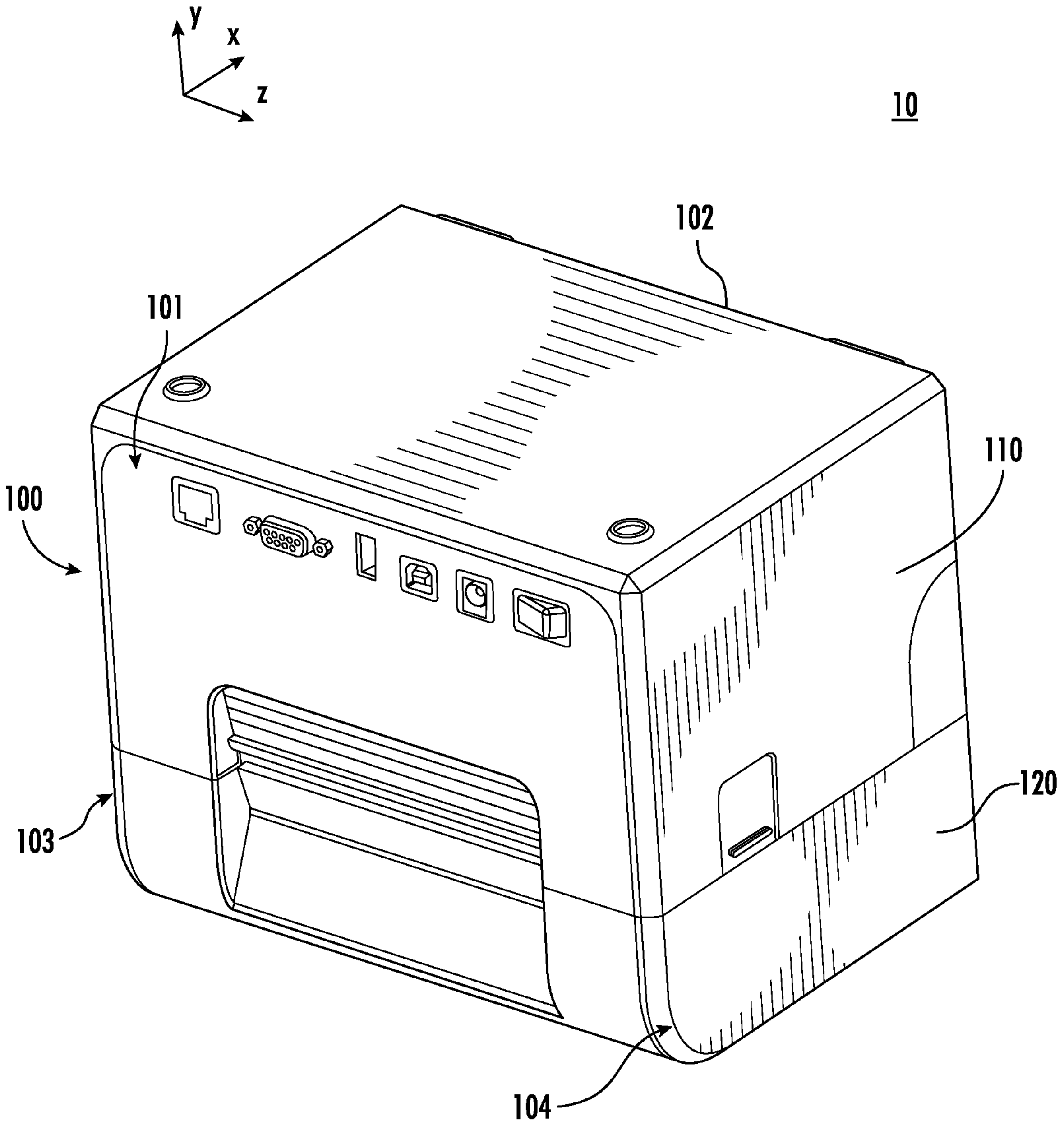
FIG. 1 illustrates a perspective view of an exemplary printer device in accordance with various embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words “example,” or “exemplary,” when used herein, are intended to mean “serving as an example, instance, or illustration.” Any implementation described herein as an “example” or “exemplary embodiment” is not necessarily preferred or advantageous over other implementations.

Various embodiments of the present invention will be described in relation to a thermal transfer printer. However, the present invention may be equally applicable to other types and styles of printers (inclusive of printer-verifiers) (e.g., a thermal direct printer, a laser toner printer, an ink drop printer, etc.).

The terms “print media,” “physical print media,” “paper,” and “labels” refer to tangible, substantially durable physical material onto which text, graphics, images and/or the like may be imprinted and persistently retained over time. Physical print media may be used for personal communications, business communications, and/or the like to convey prose expression (including news, editorials, product data, academic writings, memos, and many other kinds of communications), data, advertising, fiction, entertainment content, and illustrations and pictures. Physical print media may be generally derivatives of wood pulp or polymers, and includes conventional office paper, clear or tinted acetate media, news print, envelopes, mailing labels, product labels, and other kinds of labels. Thicker materials, such as cardstock or cardboard may be included as well. In exemplary embodiments discussed throughout this document, reference may be made specifically to “paper” or “labels;” however, the operations, system elements, and methods of such exemplary applications may be applicable to media other than or in addition to the specifically mentioned “paper” or “labels.”. In some embodiments, the print media may correspond to a continuous media that may be loaded in a printing apparatus in form of a roll or a stack, or may correspond to media that may be divided into a plurality of labels through perforations defined along a width of the print media. Alternatively or additionally, the print media may be divided into the plurality of labels through one or more marks that are defined at a predetermined distance from each other, along the length of the print media. In some example embodiments, a contiguous stretch of the print media, between two consecutive marks or two consecutive perforations, corresponds to a label of the print media.

The terms “printer” and “printing apparatus” refer to a device that may imprint texts, images, shapes, symbols, graphics such as barcodes, and/or the like onto print media to create a persistent, human-viewable representation of the corresponding texts, images, shapes, symbols, graphics, and/or the like. Printers may include, for example, laser printers, thermal printers, ink-jet printers, and/or the like.

Various example embodiments address technical problems associated with printer devices having printer housings configurable between a closed configuration and an open configuration. As understood by those of skill in the field to which the present disclosure pertains, there are numerous scenarios in which it is beneficial for a user to utilize a printer device embodying a desktop apparatus to execute a printing operation. For example, such a printer device may be disposed upon a surface such as, for example, a desktop, a table top, and/or the like, in a position that may be easily accessible to the user such that the user may retrieve a printed media dispensed therefrom or open the housing of the printer device to replace, fix, and/or otherwise engage with various internal printer components utilized by the printer device to execute a printing operation. For example, components such as a media roll and/or a ribbon can exhibit lifespans that may require recurring maintenance thereto and/or replacement thereof. In such exemplary circumstances, the housing of various printer devices may be at least partially opened such that the interior portion therein and/or the internal printer components disposed therein may be access by the user. For example, various printer devices may have housings that are configurable in an open configuration by removing and/or rearranging a housing cover component relative to a printer base within which the internal printer components are housed. Each of the internal printer components used by the printer in executing a printing operation may be secured relative to the printer base such that moving the cover component away from the closed configuration may provide access to the internal printer components that remain disposed in their respective positions within the printer base. Various printer devices having such a configuration may have undesirably bulky housing configurations defined by large printer footprints that require valuable surface area, for example, on a desktop, to be occupied by the printer device during operation thereof and/or maintenance thereto.

Various embodiments described herein relate to printer devices comprising printer housings defined by a top housing portion and a bottom housing portion, with a first portion of the internal printer components stored within the printer housing being secured relative to the bottom hosing portion and a second portion of the internal printer components being operatively secured relative to the top housing portion. For example, an exemplary printer device may comprise a media supply assembly operatively secured relative to a top housing portion that is configured to rotate between a closed configuration and an open configuration to facilitate the opening of the printer housing. In various embodiments, an exemplary printer device described herein may be configured such that the internal printer components operatively secured relative to the top housing portion, such as, for example, the media support assembly, may be moved with the top housing portion as it rotates from a closed position towards an open position. Further, as described herein, the printer device may be configured such that when the printer housing is arranged in a closed configuration, the internal printer components operatively connected to the top housing portion may define an at least partially vertically stacked configuration relative to those internal printer components secured to the bottom housing portion. In various embodiments, the printer device described herein is configured to maintain operability of the printer device for effectively and efficiently executing various printing operations, while enabling a smaller printer size defined by having an at least substantially minimized printer footprint. For example, the reduction in printer device size enabled by the present invention may further enable a decrease in the costs associated with packaging and transporting the smaller printer device compared to other larger devices.

FIG. 1 illustrates a perspective view of an exemplary printer device in accordance with various embodiments of the present disclosure. In particular, FIG. 1 illustrates a perspective view of a mobile printer device 10 configured to execute mobile printing operations using a print media housed therein. In various embodiments, an exemplary printer device 10 may comprise a printer housing 100. For example, the printer housing 100 may embody an exterior shell configured to house various internal components of the printer device 10, including, but not limited to, a ribbon, a drive assembly, a chassis, a media support assembly, and/or an internal user interface, within an interior portion thereof.

As illustrated, the printer housing 100 may comprise a top housing portion 110 and a bottom housing portion 120. In various embodiments, the[top housing portion 110 and the second housing portion 120 of the printer housing 100 may be at least partially moveable relative to one another such that the housing 100 is configurable between an open configuration and a closed configuration, as described herein. For example, FIG. 1 illustrates an exemplary configuration wherein the printer housing 100 of the exemplary printer device 10 is provided in a closed configuration. As illustrated, the printer housing 100 being in the closed configuration may be defined by the top housing portion 110 being arranged above (e.g., on top of) the bottom housing portion 120. In the closed configuration, the top housing portion 110 may be configured to engage with and/or at least partially attach to the bottom housing portion 120 to collectively define an exterior shell configured to house various internal printer components of the printer device 10 within an interior portion thereof.

In various embodiments, the top housing portion 110 of the printer housing 100 may define a cover that may be at least partially secured relative to the bottom housing portion 120 (e.g., a base), such as, for example, via a hinged connection, such that the top housing portion 110 is moveable through a range of rotational motion defined relative to the bottom housing portion 120. For example, the range of rotational motion defined by the top housing portion 110 may be defined between a closed position and an open position, corresponding to the configuration of the printer housing 100 between the closed configuration and the open configuration, respectively.

In various embodiments, wherein the printer housing 100 is provided in the closed configuration, the printer housing 100 may define a front face 101 embodying a forward-facing surface (e.g., facing in the negative x-direction as defined in the exemplary orientation illustrated in FIG. 1) defined at least in part by the respective front surfaces of the top housing portion 110 and the bottom housing portion 120; a rear face 102 embodying a rearward-facing surface (e.g., facing in the positive x-direction as defined in the exemplary orientation illustrated in FIG. 1) defined at least in part by the respective rear surfaces of the top housing portion 110 and the bottom housing portion 120; a first lateral side 103 embodying a laterally-facing surface of the printer housing 100 (e.g., facing in the negative z-direction as defined in the exemplary orientation illustrated in FIG. 1) defined at least in part by the respective first lateral surfaces of the top housing portion 110 and the bottom housing portion 120; and a second lateral side 104 embodying an oppositely laterally-facing surface of the printer housing 100 (e.g., facing in the positive z-direction as defined in the exemplary orientation illustrated in FIG. 1) defined at least in part by the respective second lateral surfaces of the top housing portion 110 and the bottom housing portion 120.

For example, the printer device 10 may be defined at least in part by a printer width defined by the distance between the opposing lateral sides (e.g., the first lateral side 103 and the second lateral side 104) of the printer housing 100, as measured in a lateral direction (e.g., in the z-direction as defined in the exemplary orientation illustrated in the exemplary embodiment shown in FIG. 1). In various embodiments wherein the printer housing 100 of an exemplary printer device 10 defines a closed configuration, as illustrated in FIG. 1, the printer device 10 may define a printer width of at least approximately between 190 mm and 210 mm (e.g., between 195 mm and 205 mm).

Figure 2:
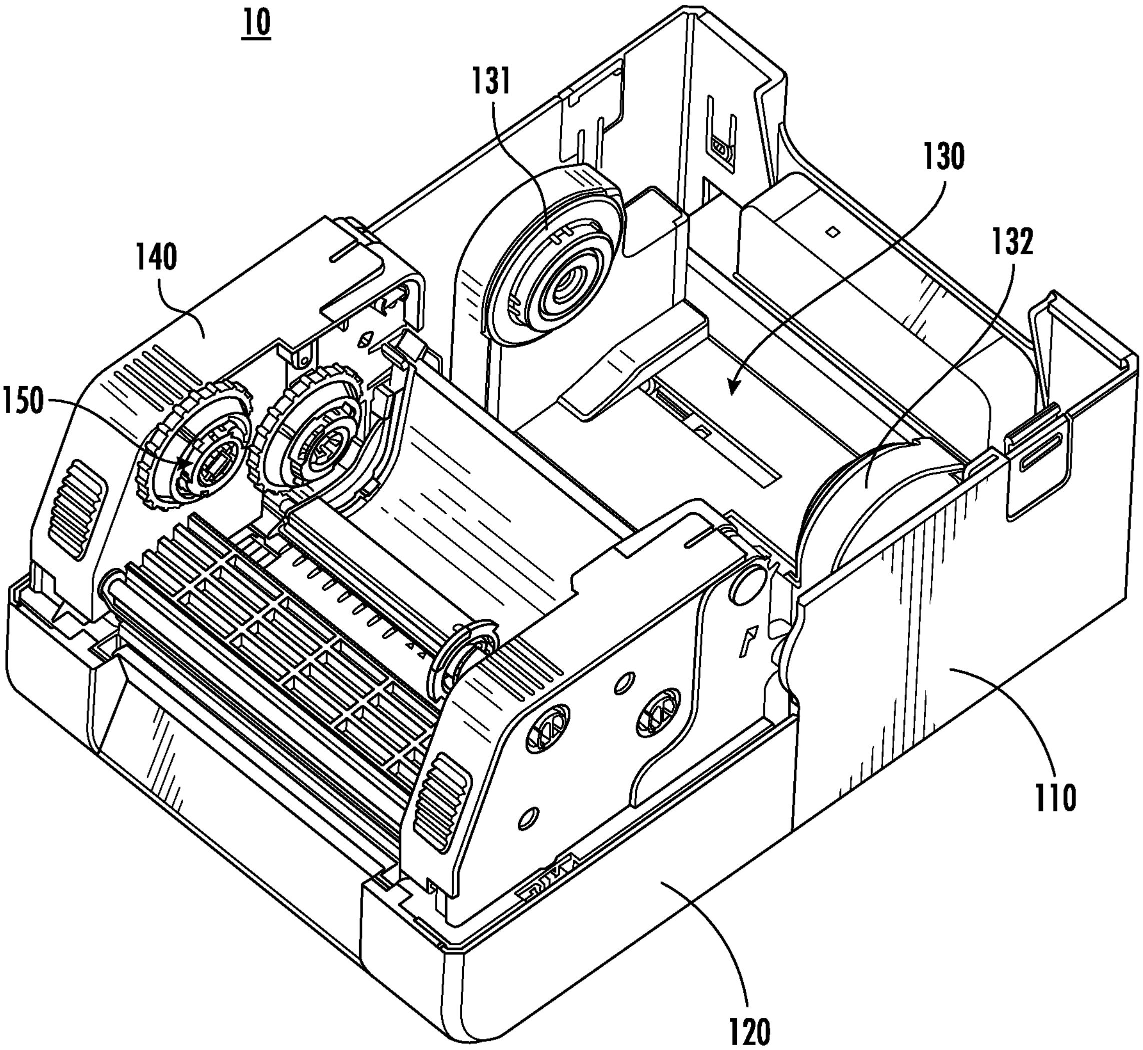
FIG. 2 illustrates a perspective view of an exemplary printer device in accordance with various embodiments of the present disclosure.

Further, the printer device 10 may be defined at least in part by a printer length defined by the distance between the front face 101 and the rear face 102 of the printer housing 100, as measured in a longitudinal direction (e.g., in the x-direction as defined in the exemplary orientation illustrated in the exemplary embodiment shown in FIG. 1). In various embodiments wherein the printer housing 100 of an exemplary printer device 10 defines a closed configuration, as illustrated in FIG. 1, the printer device 10 may define a printer length of at least approximately between 100 mm and 120 mm (e.g., between 105 mm and 115 mm). In various embodiments wherein the printer housing 100 of an exemplary printer device 10 defines an open configuration, as illustrated in FIG. 2, the printer device 10 may define an overall printer length of at least approximately between 205 mm and 240 mm (e.g., between 210 mm and 230 mm).

Further, the printer device 10 may be defined at least in part by a printer height defined by the distance between a lowermost portion (e.g., a bottom surface of the bottom housing portion 120) and an uppermost portion (e.g., the upper surface of the top housing portion 110) of the printer housing 100, as measured in a height direction (e.g., in the y-direction as defined in the exemplary orientation illustrated in the exemplary embodiment shown in FIG. 1). In various embodiments wherein the printer housing 100 of an exemplary printer device 10 defines a closed configuration, as illustrated in FIG. 1, the printer device 10 may define a printer height of at least approximately between 155 mm and 200 mm (e.g., between 160 mm and 180 mm). In various embodiments wherein the printer housing 100 of an exemplary printer device 10 defines an open configuration, as illustrated in FIG. 2, the printer device 10 may define an overall printer height of at least approximately between 135 mm and 200 mm (e.g., between 140 mm and 170 mm).

In various embodiments, the printer housing 100 being in the open configuration may be defined by the top housing portion 110 being rotated about a hinge axis relative to the bottom housing portion 120 such that one or more of the internal component housed within the interior portion of the printer housing 100 (e.g., a media support assembly, a chassis, and/or a ribbon assembly) are at least partially exposed and/or accessible to a user. For example, FIG. 2 illustrates an exemplary configuration wherein the printer housing 100 of the exemplary printer device 10 is provided in an open configuration. In various embodiments, an exemplary printer device 10 may comprise a media support assembly 130, a chassis 140, and a ribbon assembly 150.

In various embodiments, an exemplary printer device 10 may comprise a media support assembly 130 disposed within the interior portion of the printer housing 100 that is configured to receive a media roll (not shown) in order to at least partially secure the media roll within the printer housing 100. For example, the media support assembly 130 may be configured to engage a media roll (e.g., a media roll 14, as illustrated in the exemplary embodiments depicted in FIGS. 6A and 6B) such that the media roll is secured to the media support assembly 130 in an installed position defined by the arrangement of the media roll relative to one or more other internal components of the printer device 10 that enables the use (e.g., feeding) of the media roll during a printing operation. In an example embodiment, a media roll may correspond to a roll of a print media that may be a continuous media or may in some example embodiments, include one or more portions (hereinafter referred to as labels) that are defined by means of perforations or one or more marks. In various embodiments, the media support assembly 130 may be communicatively coupled to an actuation unit configured to actuate the media support assembly 130 in order to cause the media roll secured therein to rotate such that a print media is fed from the media roll and provided along a print media path defined by the printer device 10.

In various embodiments, as illustrated, the media support assembly 130 may comprise a pair of opposedly mounted media support subassemblies, including a first media support subassembly 131 and a second media support subassembly 132, configured to engage the respective lateral ends of a media roll (e.g., a print media roll) in order to at least partially secure the media roll therebetween (e.g., within the printer housing). The media support subassemblies 131, 132 may be configured to arrange a media roll disposed therebetween in an installed position that enables the media roll to be at least partially dispensed and/or fed to one or more other internal components of the printer device 10, such as, for example, a ribbon assembly 150, as part of a printing operation executed by the printer device 10. In various embodiments, the opposedly mounted media support subassemblies 131, 132 of the media support assembly 130 may be selectively moveable in one or more lateral directions such that the lateral distance defined therebetween may be varied to accommodate various media rolls of different configurations (e.g., media roll widths).

In various embodiments, an exemplary printer device 10 may further comprise a chassis 140 disposed within the interior portion of the printer housing 100 that is configured for supporting the arrangement of at least a portion of the internal printer components within the printer housing 100 in respective operating positions relative to one another to enable interaction therebetween during the execution of a printing operation. The chassis 140 may define a structural component embodying an internal frame to which one or more internal components of the printer device 10 may be secured to facilitate the arrangement thereof in an operable position within the printer housing 100. For example, the chassis 140 may be configured for securing at least a portion of a ribbon assembly 150 in an operating position defined by a relative arrangement of the ribbon assembly 150 relative to one or more other internal components of the printer device 10, such as, for example, a media support assembly 130 (e.g., a media roll), that enables an interaction therebetween to facilitate the execution of at least a portion of a printing operation. In various embodiments, as described herein, the chassis 140 of an exemplary printer device 10 may be moveable (e.g., about a chassis hinge axis) between a loading position in which the chassis 140 is configured to enable an initial feed of a new print media therethrough (e.g., as part of an initial installation of a new media roll), and an operating position in which the one or more components secured relative to the chassis 140 are provided in respective operating positions such that the printer device 10 may be operable to execute a printing operation defined by the traversal (e.g., conveyance) of a print media from the media roll within the media support assembly 130 and along a media path to a print media output defined by the printer device 10.

Figure 6A:
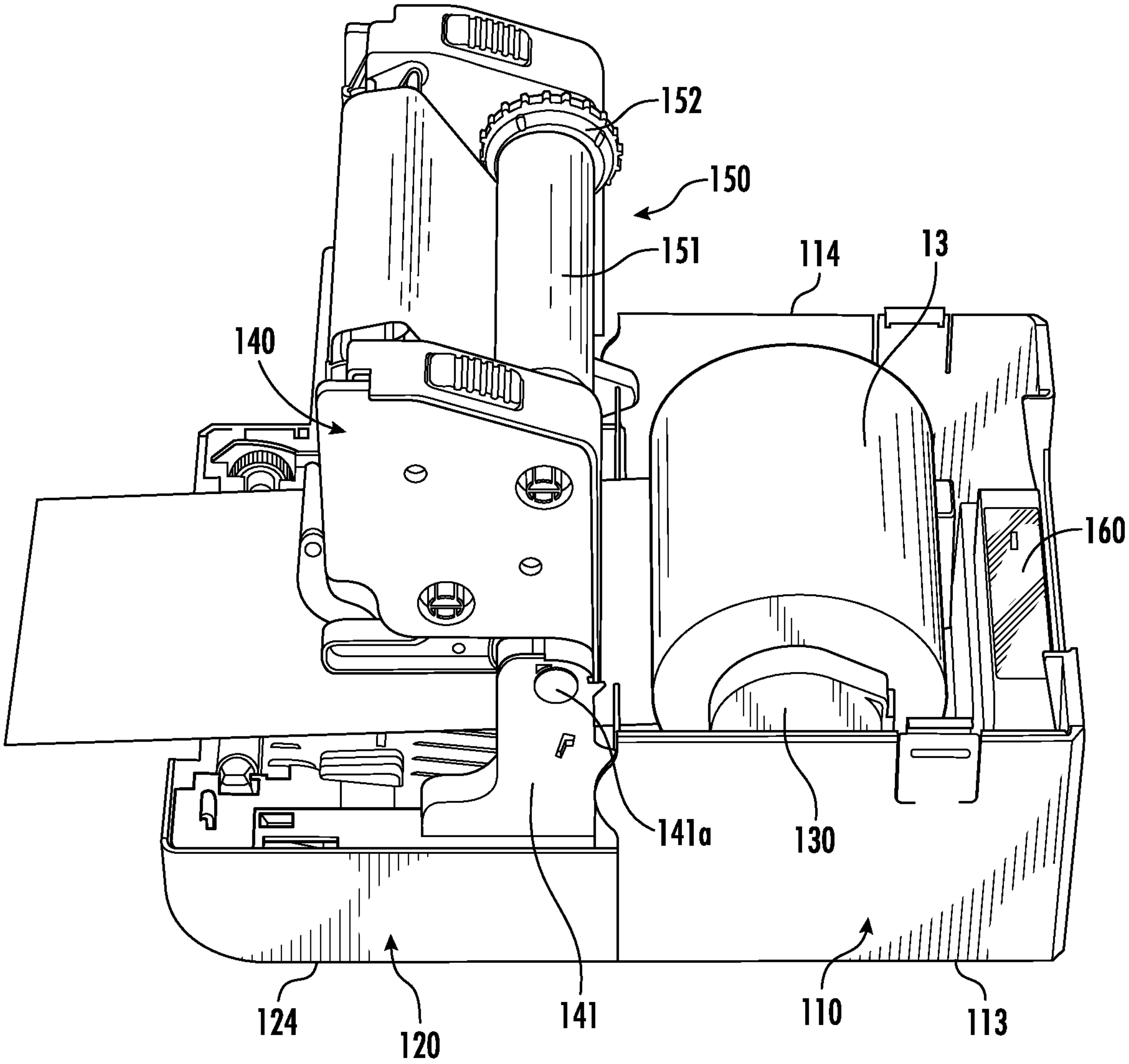
FIGS. 6A and 6B illustrate perspective views of an exemplary printer device with a printer housing provided in an open configuration in accordance with various embodiments described herein.
Figure 6B:
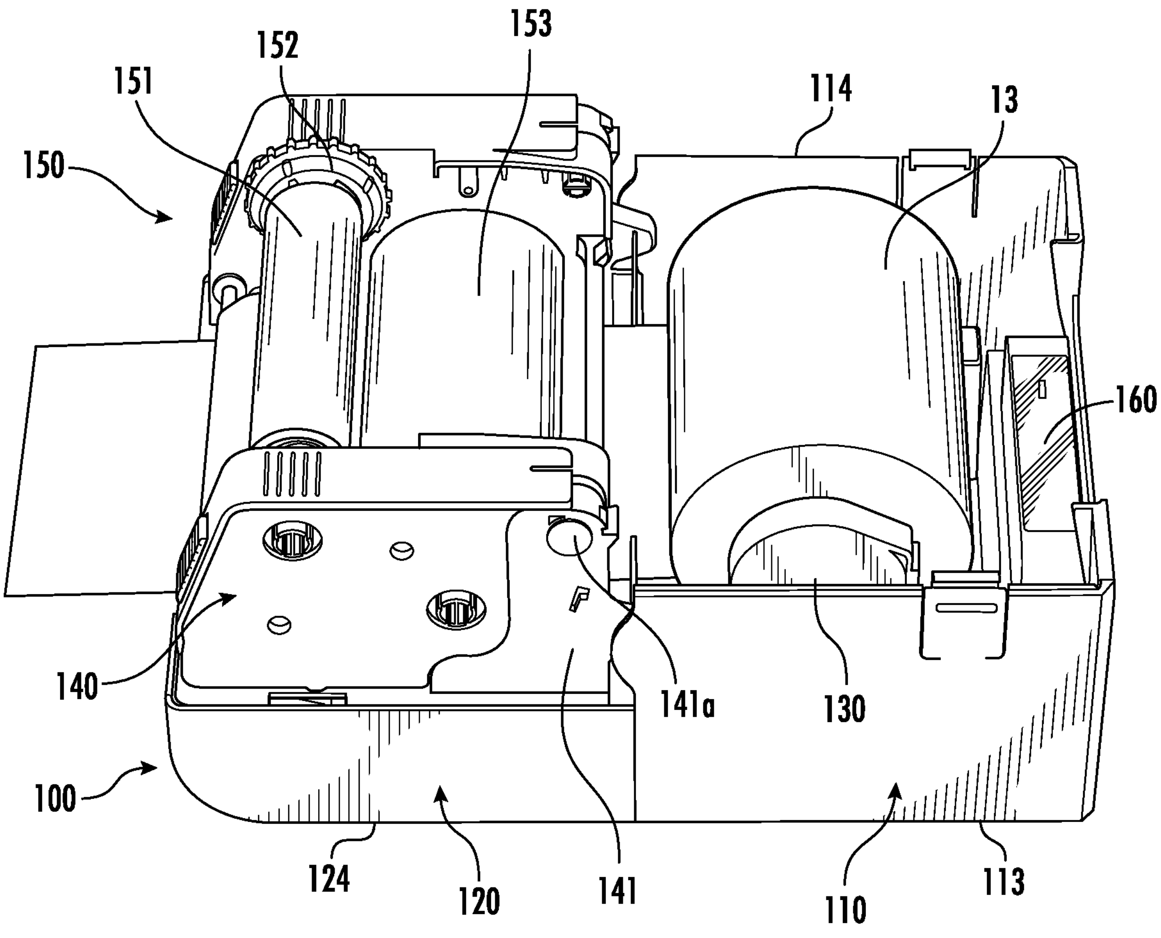

In various embodiments, an exemplary printer device 10 may further comprise a ribbon assembly 150 disposed within the interior portion of the printer housing 100 that is configured to facilitate engagement of a ribbon (e.g., a ribbon 151, as illustrated in the exemplary embodiments depicted in FIGS. 6A and 6B) with a print media in order to cause content (e.g., a print image) to be printed, transferred, and/or otherwise reproduced on the print media during a print operation. In various embodiments, a ribbon assembly 150 of an exemplary printer device 10 may comprise a ribbon, a ribbon roll, one or more ribbon drive assemblies, a ribbon take-up assembly, and/or the like. The ribbon assembly 150 may be configured to convey the ribbon throughout the interior portion of the printer housing 100 (e.g., along a ribbon path) so as to cause a repeated engagement with a print media as the print media is being moved (e.g., conveyed) along a media path towards a print media output defined by the printer device 10. For example, the ribbon assembly 150 may include a ribbon drive assembly (e.g., a ribbon drive assembly 152, as illustrated in the exemplary embodiments depicted in FIGS. 6A and 6B) configured to receive a ribbon roll (e.g., a ribbon roll 153, as illustrated in the exemplary embodiments depicted in FIGS. 6A and 6B) that corresponds to a roll of a ribbon. In an example embodiment, the ribbon may correspond to an ink media that is utilized to dispose ink onto the print media in order to print content on the print media. Further, in various embodiments, the ribbon drive assembly may be selectively actuated (e.g., driven, controlled) in order to drive a rotation of the ribbon roll that causes the ribbon roll to supply the ribbon along a ribbon path towards a print head disposed within the printer housing 100.

Further, in various embodiments, an exemplary printer device 10 may comprise a print head configured to print content on the print media prior to the dispense thereof from the printer housing (e.g., via the print media output). In an example embodiment, the print head may include a plurality of heating elements (not shown) that are energized and pressed against a ribbon of the ribbon assembly 150 to perform a print operation. In operation, the print head may apply heat on a portion of the ribbon and, concurrently, presses the ribbon against at least a portion of the print media to cause the ink to transfer onto the print media. In an exemplary configuration wherein the print media disposed within the printer device 10 embodies thermal paper, the print head may be configured to be pressed directly against the thermal paper to perform the print operation.

In various embodiments, at least a portion of the internal components of the printer device 10 may be secured relative to the top housing portion 110 of the printer housing 100. As a non-limiting example, the exemplary printer device 10 illustrated in FIG. 2 comprises a media support assembly 130 that is operatively secured to the top housing portion 110 of the printer housing 100 such that the media support assembly 130 is moved with the top housing portion 110 as the top housing portion 110 is rotated to configure the printer housing 110 in the illustrated open configuration. Further, in various embodiments, at least a portion of the internal components of the printer device 10 may be secured relative to the bottom housing portion 120 of the printer housing 100. For example, as illustrated, the exemplary printer device 10 illustrated in FIG. 2 comprises a chassis 140 that is operatively secured to the bottom housing portion 120 of the printer housing 100. In such an exemplary configuration, the printer housing 100 being opened such that the top housing portion 110 is rotated from the closed position towards the open position, as described herein, may cause the media supply assembly 130 attached to the top housing portion 110 to move relative to the chassis 140.

Further, in various embodiments, at least a portion of a ribbon assembly 150 may be connected to the chassis 140 so as to define an operative connection of the ribbon assembly 150 relative to the bottom housing portion 120 (e.g., via the chassis 140). In such an exemplary configuration, an opening of the printer housing 100 defined by the top housing portion 110 being reconfigured to the open position may cause the media supply assembly 130 attached to the top housing portion 110 to move at least relative to the portion of the ribbon assembly 150 secured to the chassis 140. As a non-limiting example, in various embodiments wherein the printer housing 100 is arranged in a closed configuration, the media support assembly 130 secured to the top housing portion 110 and the chassis 140 secured to the bottom housing portion 120 may be arranged in an at least partial vertically-stacked configuration defined by at least a portion of the media support assembly 130 being disposed vertically above at least a portion of the chassis 140. For example, at least a portion of the media support assembly 130 may be positioned to overlap at least a portion of the chassis 140 by defining a vertical position above the at least a portion of the chassis 140. In various embodiments, an exemplary printer device 10 may be configured such that opening the printer housing 100 from the closed configuration to the open configuration illustrated in FIG. 2 may cause the top housing portion 110 to rotate from a closed position in which the top and bottom housing portions 110, 120 collectively define a vertically stacked arrangement, to an open position in which the top and bottom housing portions 110, 120 are arranged in a horizontally distributed (e.g., side-by-side) configuration relative to one another. In such an exemplary circumstance, the printer housing 100 is configured to move the media support assembly 130 at least partially away from the vertically stacked configuration with the chassis 140 as the top housing portion 110 is rotated towards the open position. For example, the printer housing 100 being arranged in an open configuration, as illustrated, may be defined by the media support assembly 130 operatively secured to the top housing portion 110 and the chassis 140 operatively secured to the bottom housing portion 120 in a horizontally distributed arrangement (e.g., in a side-by-side configuration). For example, in such an exemplary configuration wherein the printer housing is provided in an open configuration, the printer device 10 may be configured such that both the media support assembly 130 and the chassis 140 (e.g., and/or at least a portion of the ribbon assembly 150 secured relative thereto) are at least partially accessible to a user via respective openings in the top housing portion 110 (e.g., defined by a lower boundary edge 114) and the bottom housing portion 120 (e.g., defined by an upper boundary edge 123) in order to facilitate user interaction therewith.

Figure 3A:
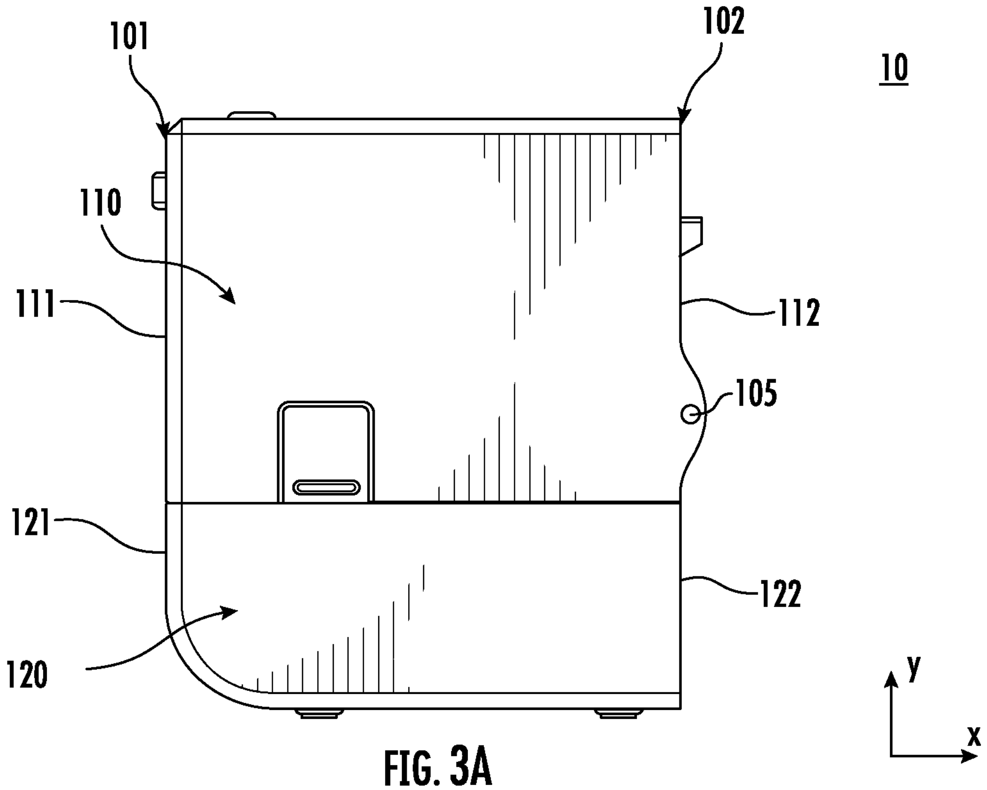
FIGS. 3A and 3B illustrate side views of an exemplary printer device according to various embodiments described herein.
Figure 3B:
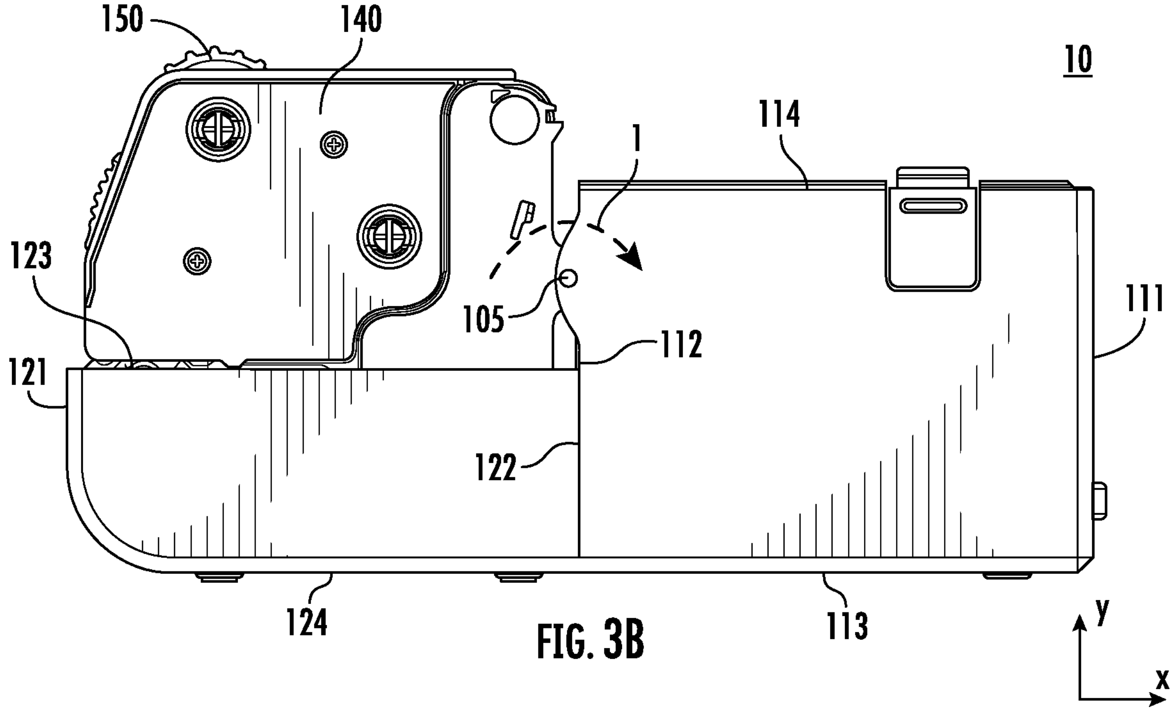

FIGS. 3A and 3B illustrate side views of an exemplary printer device according to various embodiments described herein. In particular, FIGS. 3A and 3B illustrate exemplary embodiments wherein the printer housing 100 of a printer device 10 is a closed configuration and an open configuration, respectively. As described herein, an exemplary printer device 10 may comprise a printer housing 100 having a top housing portion 110 and a bottom housing portion 120 that are hingedly connected about a hinge 105. In various embodiments, the top housing portion 110 may embody a cover defining an upper shell portion of the exterior shell defined by the printer housing 100. As illustrated in FIG. 3A, the top housing portion 110 may be configured to be disposed on top of the bottom housing portion 120 when the printer housing 100 is arranged in the closed configuration. For example, when the printer housing 100 is arranged in the closed configuration, the top housing portion 110 (e.g., a lower boundary edge thereof) may engage at least a portion of the bottom housing portion 120 (e.g., an upper boundary edge thereof) to facilitate the positioning of the top housing portion 110 on top of the bottom housing portion 120 such that the interior portion of the printer housing 100 is at least partially enclosed with the top housing portion 110 providing coverage over the internal components disposed within the printer housing 100.

In various embodiments, the top housing portion 110 may include a front surface 111 and an opposing rear surface 112. As illustrated, the front surface 111 of the top housing portion 110 may be defined by a surface of the top housing portion 110 that, when the printer housing 100 is provided in the closed configuration, faces in a forward-facing direction (e.g., in the negative x-direction as defined in the exemplary orientation illustrated in FIG. 3A) and defines at least a portion of a front face of the printer device 10. Further, the rear surface 112 of the top housing portion 110 may be defined by a surface provided on the opposite side of the top housing portion 110 relative to the front surface 111. For example, when the printer housing 100 is provided in the closed configuration, the rear surface 112 faces in a rearward-facing direction (e.g., in the positive x-direction as defined in the exemplary orientation illustrated in FIG. 3A) and defines at least a portion of a rear face of the printer device 10.

In various embodiments, the bottom housing portion 120 of the printer housing 100 may embody a base defining a lower shell portion of the exterior shell defined by the printer housing 100. As illustrated in FIG. 3A, the bottom housing portion 110 may be configured to be disposed beneath the top housing portion 110 when the printer housing 100 is arranged in the closed configuration. For example, when the printer housing 100 is arranged in the closed configuration, the bottom housing portion 120 (e.g., an upper boundary edge thereof) may be engaged by at least a portion of the top housing portion 110 (e.g., a lower boundary edge thereof) to at least partially support the top housing portion 110 in a position on top of the bottom housing portion 120. In various embodiments, the bottom housing portion 120 may include a front surface 121 and an opposing rear surface 122. As illustrated, the front surface 121 of the bottom housing portion 120 may be defined by a surface of the bottom housing portion 120 that faces in a forward-facing direction (e.g., in the negative x-direction as defined in the exemplary orientation illustrated in FIG. 3A) and defines at least a portion of the front face of the printer device 10. Further, the rear surface 122 of the bottom housing portion 120 may be defined by a surface provided on the opposite side of the bottom housing portion 120 relative to the front surface 121. For example, the rear surface 122 faces in a rearward-facing direction (e.g., in the positive x-direction as defined in the exemplary orientation illustrated in FIG. 3A) and defines at least a portion of the rear face of the printer device 10.

In various embodiments, the printer housing 100 may be configured such that the rear surfaces 112, 122 of the top housing portion 110 and the bottom housing portion 120 may each define at least substantially flat planar surfaces. Further, in various embodiments, printer housing 100 may be configured such that, upon being arranged in the closed configuration, the 112 is stacked directly above the 122 such that the rear surfaces 112, 122 collectively define an at least substantially continuous rear face of the printer device 10. In such an exemplary configuration, as illustrated, the respective rear surfaces 112, 122 of the first and second housing portions 110, 120 may each define an at least substantially vertical configuration (e.g., provided within the y-z plane as defined in the exemplary orientation illustrated in FIG. 3A) such that the rear surface 122 and the rear surface 112 stacked vertically there-above may collectively define a vertical rear face of the printer device 10 (e.g., of the printer housing 100).

As illustrated in FIG. 3B, the top housing portion 110 and the bottom housing portion 120 of the printer housing 100 may be hingedly connected about a hinge 105 (e.g., one or more shaft elements) such that opening the printer housing 100 from a closed configuration to an open configuration comprises rotating the top housing portion 110 about an axis of rotation defined by the hinge 105.

In various embodiments, as described herein, the hinge 105 operatively securing the top housing portion 110 relative to the bottom housing portion 120 may be configured such that an axis of rotation defined by the hinge 105 is defined in a lateral direction (e.g., between opposing lateral sides of the printer housing 100). For example, in various embodiments, the printer housing 100 may be configured such that the axis of rotation defined by the hinge 105 is defined in a direction that is at least substantially parallel to at least a portion of the rear surface 112 of the top housing portion 110 and/or the rear surface 122 of the bottom housing portion 120.

In various embodiments, the hinge 105 may be positioned along a rear face 102 of the printer device 10. For example, in various embodiments, the hinge 105 may be positioned at a rear surface 112 of the top hosing portion 110 of the printer housing 100. In various embodiments, the hinge 105 defining the hinged connection between the top and bottom housing portions 110, 120 may at least partially define the range of rotation motion through which the top housing portion 110 is rotated as the printer housing 100 is reconfigured between the open configuration and the closed configuration. For example, as illustrated in FIG. 3B, the hinge 105 defines a hinge axis about which the top housing portion 110 may be rotated in the first rotational direction 1 to an open position such that the printer housing 100 defines an open configuration. As illustrated, the first rotational direction 1 may be defined by a clockwise rotation of the top housing portion 110 about the hinge pin (e.g., a hinge pin thereof), as viewed from the side perspective of the printer device 10 illustrated in FIGS. 3A and 3B. For example, the top housing portion 110 may be rotated in the first rotational direction 1 to an open position defined by the rear surface 112 of the top housing portion 110 physically engaging (e.g., abutting against) the rear surface 112 of the bottom housing portion 120. As illustrated in FIG. 3B, at least a portion of the rear surface 112 of the top housing portion 110 may be secured against the rear surface 122 of the bottom housing portion 120 so as to define a contact area (e.g., within a plane of contact) along at least a portion of the rear surface 112 at which the top housing portion 110 in the open position interfaced with the rear surface 122 of the bottom housing portion 120. In various embodiments wherein the hinge 105 is disposed at the rear surface 112 of the top housing portion 110, opening the printer housing from the closed configuration to the open configuration may be defined by a rotation of the top housing portion 110 about the hinge axis defined by the hinge 105 (e.g., in the first rotational direction 1) through an angle of rotation of at least approximately 180 degrees. For example, in such an exemplary configuration wherein the hinge 105 is disposed at the rear surface 112 of the top housing portion 110, the printer housing 100 being configured in an open configuration, as illustrated in FIG. 3B, may be defined at least in part by the top housing portion 110 being provided in a vertically inverted arrangement. As illustrated, the vertically inverted arrangement exhibited by the top housing portion 110 when the top housing portion 110 is provided in the open position (e.g., when the printer housing 100 is in the open configuration) may be defined at least in part by the upper surface 113 of the top housing portion 110 being arranged in an at least substantially coplanar alignment with at least a portion of the bottom surface 124 of the bottom housing portion 120.

In various embodiments, the exemplary printer device 10 may further comprise one or more temporary (e.g., detachable) fastening elements (not shown) disposed along an exterior portion of the printer housing 110 at corresponding positions on the top housing portion 110 and the bottom housing portion 120. As described herein, the printer device 10 may include a first temporary fastening element provided at and/or accessible via the rear surface 112 of the top housing portion 110 and a second temporary fastening element provided at the rear surface 122 of the bottom housing portion 120. The first temporary fastener element secured to the rear surface 112 is configured to engage the second temporary fastener element provided on the rear surface 122 as the top housing portion is rotated in the first rotational direction 1 towards the open position. For example, the first and second temporary fastening elements may be provided at corresponding positions at the rear surface 112 and the rear surface 122, respectively, such that as the top housing portion 110 is rotated towards the open position, as illustrated in FIG. 3B, the first temporary attachment element may be moved into a position that is at least substantially adjacent the second temporary fastener element disposed on the bottom housing portion 120 (e.g., at rear surface 122). As described herein, the first and second temporary fastener elements may be configured to engage one another in order to establish a detachable connection of the rear surface 112 of the top housing portion 110 relative to the rear surface 122 of the bottom housing portion 120, such that the printer housing 100 may be at least temporarily maintained in an open configuration. As a non-limiting example, the first and second temporary fastening elements may embody corresponding magnetic elements configured to define an attractive magnetic force therebetween to pull the rear surface 112 of the top housing portion 110 against the rear surface 122 of the bottom housing portion 120 to facilitate the at least temporary retention of the top housing portion 110 in the open position.

Figure 4:
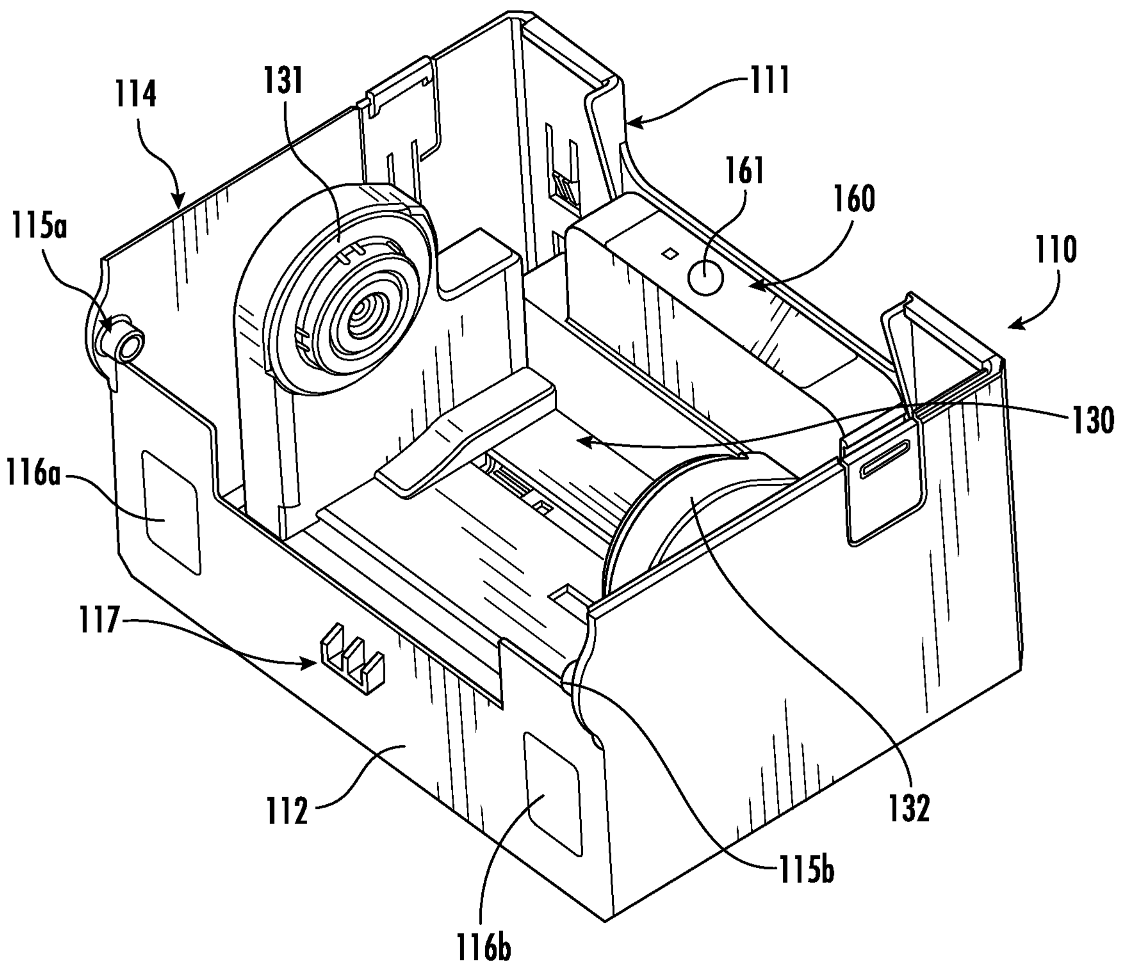
FIG. 4 illustrates a perspective view of a top housing portion of an exemplary printer device and various internal printer components disposed therein, according to various embodiments described herein.

FIG. 4 illustrates a perspective view of a top housing portion of an exemplary printer device and various internal printer components disposed therein, according to various embodiments described herein. In particular, FIG. 4 illustrates an isolated view of an exemplary top housing portion 110 having a media support assembly 130 operably attached thereto (e.g., relative to an interior surface of the top housing portion 110).

In various embodiments, an exemplary printer device may be configured such that at least a portion of the media support assembly 130 is operatively secured to the top housing portion 110 of the printer housing. For example, the media support assembly 130 may be attached to one or more interior surfaces of the top housing portion 110. In various embodiments, the media support assembly 130 may be attached to the top housing portion 110 such that the media support assembly 130 moves with the top housing portion 110 as the printer housing is moved between the open and closed configurations. For example, the media support assembly 130 may be installed within the top housing portion 110 such that as the printer housing is opened from the closed configuration to the open configuration, the media support assembly 130 is moved relative to the bottom housing portion and the internal components housed therein. Further, as described herein, the media support assembly 130 may be installed within the top housing portion 110 such that, when the printer housing is provided in the closed configuration, the media support assembly 130 is disposed in an operable position relative to one or more internal printer components secured relative to the bottom housing portion of the printer housing (e.g., a chassis, a ribbon assembly, and/or the like) to facilitate interaction therewith and/or operation of printer device using a media roll (not shown) secured within the media support assembly 130.

In various embodiments, as illustrated, the media support assembly 130 may be operatively connected to the top housing portion 110 at an interior top surface thereof defined by an underside of the exterior top surface of the top housing portion 110. In such an exemplary configuration, the media support assembly 130 may face in a direction at least substantially away from the interior top surface of the top housing portion 110 to which it is secured such that the media support assembly 130 may be accessed through an opening in the bottom of the top housing portion 110 defined by the lower boundary edge 114. For example, the opposedly mounted media support subassemblies 131, 132 of the media support assembly 130 may extend away from the interior top surface of the top housing portion 110 in order to facilitate installation of a media roll (e.g., a print paper roll) within the media support assembly 130 when the printer housing is provided in the open configuration.

In various embodiments, the top housing portion 110 of the printer housing of an exemplary printer device may define one or more hinge elements 115*a*, 115*b* configured to facilitate the hinged connected between the top housing portion 110 and the bottom housing portion of the printer housing, as described herein. For example, in various embodiments, the top housing portion 110 may define a first hinge protrusion 115*a* provided along a first interior lateral surface of the top housing portion 110 (e.g., defined by an interior surface opposing an exterior lateral surface of the top housing portion 110). Further, the top housing portion 110 may define a second hinge protrusion 115*b* provided along a second interior lateral surface of the top housing portion 110 that faces towards the first interior lateral surface from which the first hinge protrusion 115*a* protrudes. In various embodiments, the first hinge protrusion 115*a* and the second hinge protrusion 115*b* may be coaxially arranged such that the axis of rotation defined by hinge of the printer device (e.g., hinge 105 as described in reference to the exemplary embodiment illustrated in FIGS. 3A and 3B) spans the width of the printer device between the first and second hinge protrusions 115*a*, 115*b*. As a non-limiting example, in various embodiments, the first hinge protrusion 115*a* and the second hinge protrusion 115*b* may be configured to engage a respective hinge positioning elements defined by the bottom housing element in order to define the hinged configuration of the top housing portion 110 relative to the bottom housing portion.

In various embodiments, an exemplary printer device may be configured such that an internal user interface 160 is operatively secured to the top housing portion 110 of the printer housing. For example, the internal user interface 160 may be attached to one or more interior surfaces of the top housing portion 110. In various embodiments, the internal user interface 160 may be attached to the top housing portion 110 such that the internal user interface 160 moves with the top housing portion 110 as the printer housing is moved between the open and closed configurations. For example, the internal user interface 160 may be installed within the top housing portion 110 such that as the printer housing is opened from the closed configuration to the open configuration, the internal user interface 160 is moved relative to the bottom housing portion and the internal components housed therein. Further, as described herein, the internal user interface 160 may be installed within the top housing portion 110 such that, when the printer housing is provided in the closed configuration, the internal user interface 160 is fully contained within the interior portion of the printer housing and inaccessible to a user without opening the printer housing.

In various embodiments, as illustrated, the internal user interface 160 may be operatively connected to the top housing portion 110 at an interior front surface thereof defined by a backside of the exterior front surface 112 of the top housing portion 110. For example, the internal user interface 160 may include interface elements 161 defined by one or more buttons, surfaces, and/or the like configured to be engaged by a user that, upon the printer housing being provided in an open configuration, may face in direction at least substantially towards the opening in the bottom of the top housing portion 110 defined by the lower boundary edge 114 to facilitate user interaction therewith via access provided by the bottom opening.

In various embodiments, an exemplary printer device may be configured such that the top housing portion 110 of the printer housing includes one or more temporary fastening elements provided at the rear surface 112 of the top housing portion 110 and configured to facilitate an at least temporary arrangement of the printer housing in an open configuration. For example, as illustrated, the exemplary top housing portion 110 may include a first temporary fastening element 116*a* and a second temporary fastening element 116*b* distributed along the rear surface 112. In various embodiments, the one or more temporary fastening elements 116*a*, 116*b* defined by, attached to, and/or imbedded within the rear surface 112 of the top housing portion 110 may be configured to engage one or more corresponding fastener elements defined by the bottom housing portion upon the top housing portion being opened (e.g., rotated about the hinge axis) toward the open configuration. In various embodiments, the one or more temporary fastening elements 116*a*, 116*b* may be configured to engage a corresponding fastening element provided on the bottom housing portion via various mechanical fastening means, such as, for example, hook and loop fasteners, snaps, buttons, magnets, and/or the like, including any mechanism that may be used to facilitate the temporary and/or semi-permanent attachment and detachment of the top housing portion 110 relative to the bottom housing portion of the printer housing.

The one or more temporary fastening elements 116*a*, 116*b* may engage the corresponding one or more temporary fastening elements defined by the bottom housing portion (e.g., along the rear surface thereof) in order to at least partially secure the position of the top housing portion 110 (e.g., the rear surface 112 along which the one or more temporary fastening elements 116*a*, 116*b* are provided) relative to the rear surface of the bottom housing portion of the printer housing. As a non-limiting example, the first and second temporary fastening elements 116*a*, 116*b* may each embody magnets configured to be attracted to a corresponding magnet provided at a rear surface of the bottom housing portion such that, upon the top housing portion 110 being arranged in an open position, one or more attractive forces defined between the first and second temporary fastening elements 116*a*, 116*b* and the bottom housing portion (e.g., the corresponding magnets thereon) causes the top housing portion 110 to be retained in a position wherein the rear surface 112 thereof is physically abutted against the rear surface of the bottom housing portion. For example, securing the rear surface 112 of the top housing portion 110 relative to the rear surface of the bottom housing portion (e.g., via the temporary engagement of the one or more temporary fastening elements 116*a*, 116*b* to a corresponding one or more temporary fastening elements of the bottom housing portion) may function to at least temporarily maintain the printer housing in the open configuration. The operative attachment of the one or more temporary fastening elements 116*a*, 116*b* to the rear surface of the bottom housing portion of the printer housing may prevent the top housing portion 110 from rotating relative to the bottom housing portion (e.g., towards a closed position). In various embodiments, the one or more temporary fastening elements 116*a*, 116*b* may be configured such that a user interaction with the top housing portion 110 defined by a sufficiently large separation force may cause the one or more temporary fastening elements 116*a*, 116*b* to detach from the bottom housing portion such that the top housing portion is free to rotate (e.g., about the hinge axis) towards a closed position, as described herein.

In various embodiments, the top housing portion 110 may further comprise an alignment protrusion 117 disposed along the rear surface thereof that is configured to engage a corresponding alignment feature defined by the bottom housing portion as the top housing portion 110 is being rotated (e.g., about the hinge) towards the open position. In various embodiments, the alignment protrusion 117 may protrude in an outward direction away from the rear surface. For example, as described herein, a printer housing being opened from a closed configuration towards an open configuration may be defined by a rotation (e.g., about the hinge axis) of the top housing portion 110 relative to the bottom housing portion that causes the rear surface 112 to approach a corresponding rear surface of the bottom housing portion. In various embodiments, the alignment protrusion 117 may be configured to engage a corresponding alignment feature defined by the bottom housing portion (e.g., on the rear surface thereof) as the rear surface 112 of the top housing portion 110 approaches the rear surface of the bottom housing portion in order to establish an aligned relative position between the top and bottom housing portions when the printer housing is in the open configuration. For example, the rotation of the top housing portion 110 towards the open position may cause the alignment protrusion 117 to be moved towards the rear surface of the bottom housing portion and such that the alignment protrusion 117 is at least partially received within an alignment slot provided along the rear surface of the bottom housing portion. The alignment protrusion 117 may be configured to engage the corresponding alignment slot of the bottom housing portion to guide the motion of the top housing portion 110 relative to the bottom housing portion as it approaches the open position. For example, the alignment protrusion 117 being disposed within the alignment slot of the bottom housing portion may at least partially restrict the motion of the alignment protrusion 117 relative to the bottom housing portion in order to facilitate a repeatable arrangement of the printer housing in an open configuration in which the top housing portion 110 and the bottom housing portion (e.g., and the internal components attached to the respective housing portions) are properly aligned with one another to enable operation of the exemplary printer device.

Figure 5:
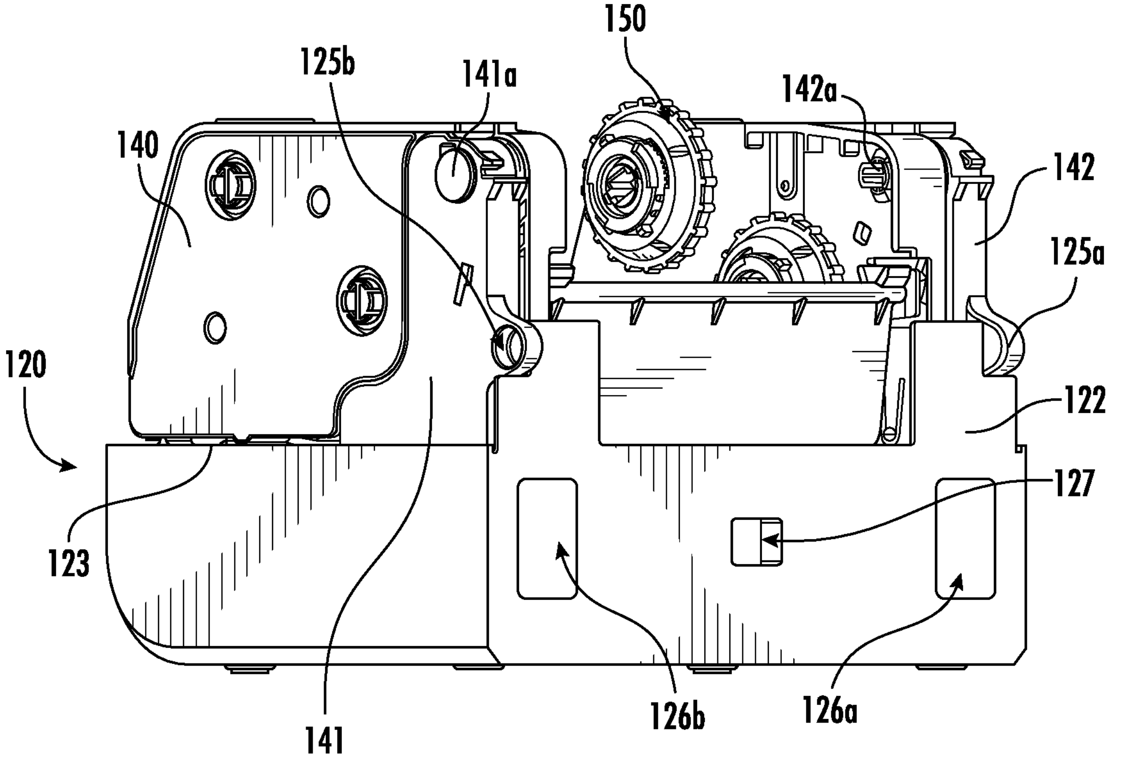
FIG. 5 illustrates a perspective view of a bottom housing portion of an exemplary printer device and various internal printer components disposed therein, according to various embodiments described herein.

FIG. 5 illustrates a perspective view of a bottom housing portion of an exemplary printer device and various internal printer components disposed therein, according to various embodiments described herein. In particular, FIG. 5 illustrates an isolated view of an exemplary bottom housing portion 120 having a chassis 140 and a ribbon assembly 150 operably attached thereto (e.g., relative to an interior surface of the bottom housing portion 120).

In various embodiments, an exemplary printer device may be configured such that at least a portion of a chassis 140 is operatively secured to the bottom housing portion 120 of the printer housing. For example, the chassis 140 may be attached to one or more surfaces of the bottom housing portion 120. In various embodiments, the chassis 140 may be attached to the bottom housing portion 120 such that the chassis 140 is maintained in an at least substantially stationary position relative to the bottom housing portion 120 as the top housing portion 110 is moved (e.g., rotated) between the open and closed positions. For example, the chassis 140 may be installed within the bottom housing portion 120 such that as the printer housing is opened from the closed configuration to the open configuration, the top housing portion of the printer housing and the internal components housed therein (e.g., the media support assembly, the internal user interface, and/or the like) are moved relative to the chassis 140, such as, for example, in a direction at least partially away from the chassis 140. Further, as described herein, the chassis 140 may be installed within the bottom housing portion 120 such that, when the printer housing is provided in the closed configuration, the chassis 140 is disposed in an operable position relative to one or more internal printer components secured relative to the top housing portion of the printer housing (e.g., a media support assembly, and/or the like) to facilitate interaction therewith in order to execute at least a portion of a printing operation.

In various embodiments, an exemplary chassis 140 may comprise a plurality of chassis attachment elements attached to the bottom housing portion 120, each configured to engage a respective portion of the chasses 140 so as to define the operative connection of the chassis 140 to the bottom housing portion 120. As illustrated in FIG. 5, an exemplary chassis 140 may be secured relative to the bottom housing portion 120 via a first chassis attachment element 141 and a second chassis attachment element 142. As illustrated in FIG. 5, the first and second chassis attachment elements 141, 142 may be secured to a respective the lateral side of the bottom housing portion 120. In such an exemplary configuration, the first and second chassis attachment elements 141, 142 may be configured to engage the body of the chassis 140 at opposing lateral sides thereof to establish the operative connection of the chassis 140 (e.g., the chassis body) to the bottom housing portion 120.

In various embodiments, the chassis 140 may be configured such that the respective attachments of the chassis 140 (e.g., the chassis body) to the first and second chassis attachment elements 141, 142 may each be defined by a hinged configuration such that the chassis 140 is configured for selective rotation relative to the first and second chassis attachment elements 141, 142 between a first chassis position and a second chassis position. For example, in various embodiments, the hinged connections between the chassis 140 and the first and second chassis attachment elements 141, 142 may each be defined by an attachment of the respective lateral side of the chassis 140 to the corresponding chassis attachment element that allows for the respective lateral side of the chassis 140 to be rotated about a hinge axis relative to the chassis attachment element connected thereto. As illustrated, a first lateral side of the chassis 140 may be connected to the first chassis attachment element 141 via a first hinge element 141*a* (e.g., a first hinge pin) configured to define a first hinge axis about which the first lateral side of the chassis 140 may rotate relative to the first chassis attachment element 141. Further, an opposing second lateral side of the chassis 140 may be connected to the second chassis attachment element 142 via a second hinge element 142*a* (e.g., a second hinge pin) configured to define a second hinge axis about which the second lateral side of the chassis 140 may rotate relative to the second chassis attachment element 142. For example, in various embodiments, the first and second chassis attachment elements 141, 142 may be configured such that the first and second hinge axes defined by the first and second hinge elements 141*a*, 142*a* may define a coaxial arrangement such that the chassis 140 is configured about a lateral axis of rotation defined in the width direction in between the first and second hinge elements 141*a*, 142*a*. For example, as described in further detail herein, the chassis 140 may be configured for selective rotation about an axis of rotation defined by the respective first and second hinge elements 141*a*, 142*a* between a loading position and an operating position.

In various embodiments, an exemplary printer device may be configured such that at least a portion of the ribbon assembly 150 is operatively secured to the bottom housing portion 120 of the printer housing. For example, the ribbon assembly 150 may be attached to the chassis 140 that is operatively connected to the bottom housing portion 120. In various embodiments, the ribbon assembly 150 may be directly and/or indirectly secured relative to the bottom housing portion 120 such that the ribbon assembly 150 is maintained in an at least substantially stationary position relative to the bottom housing portion 120 as the top housing portion 110 is moved (e.g., rotated) between the open and closed positions. For example, at least a portion of the ribbon assembly 150 may be attached to the chassis 140 such that the least a portion of the ribbon assembly 150 is operatively secured to the bottom housing portion 120 based at least in part on the attachment of the chassis 140 to one or more surfaces of the bottom housing portion 120. Further, in various embodiments, at least a portion of the ribbon assembly 150 may be attached to a surface (e.g., an interior surface) of the bottom housing portion 120 such that the least a portion of the ribbon assembly 150 is operatively secured to the bottom housing portion 120 based at least in part on the direct attachment to the bottom housing portion 120.

In various embodiments, the ribbon assembly 150 may be installed relative to the bottom housing portion 120 such that as the printer housing is opened from the closed configuration to the open configuration, the top housing portion and the internal components secured thereto therein (e.g., the media support assembly, the internal user interface, and/or the like) are moved relative to the ribbon assembly 150. Further, as described herein, the ribbon assembly 150 may be installed within the bottom housing portion 120 such that, when the printer housing is provided in the closed configuration, the ribbon assembly 150 is disposed in an operable position relative to the media support assembly attached to the top housing portion facilitate interaction therewith in order to execute at least a portion of a printing operation.

In various embodiments, the bottom housing portion 120 of the printer housing of an exemplary printer device may define one or more hinge elements 125*a*, 125*b* configured to facilitate the hinged configuration of the top housing portion of the printer housing relative to the bottom housing portion 120, as described herein. For example, in various embodiments, the one or more hinge elements of the bottom housing portion 120 may be defined by a first hinge positioning element 125*a* provided along a first lateral side of the bottom housing portion 120 and a second hinge positioning element 125*b* provided along an opposing second lateral side of the bottom housing portion 120. In various embodiments, the first hinge positioning element 125*a* and the second hinge positioning element 125*b* may each be configured for engaging a respective portion of the top housing portion (e.g., a corresponding hinge protrusion defined by the top housing portion) to secure the top housing portion relative to the bottom housing portion 120 in one or more linear directions. For example, the first hinge positioning element 125*a* and the second hinge positioning element 125*b* may be configured to engage a first hinge protrusion and a second hinge protrusion, respectively, defined by the top housing portion. In such an exemplary configuration, the first and second hinge positioning elements 125*a*, 125*b* may each be configured to define a hinged engagement of the respective hinge protrusion engaged therewith in which the respective hinge protrusions are configured to rotate about a respective central axis thereof within the corresponding hinge positioning element 125*a*, 125*b* as the top housing portion is rotated between the open and closed positions. As an illustrative example, in various embodiments, one or more of the hinge positioning elements 125*a*, 125*b* may embody a hoop element, a loop element, and/or the like that defines an opening within which a hinge protrusion (e.g., a hinge pin) defined by the top housing portion may be inserted to at least partially secure the top housing portion relative to the bottom housing portion 120 and establish an axis of rotation that defines the hinged configuration of the printer housing, as described herein. As illustrated, the first hinge positioning element 125*a* and the second hinge positioning element 125*b* may be coaxially arranged such that the one or more hinge elements defined by the top housing portion (e.g., a first and second hinge protrusion) that are received within the first and second hinge positioning elements 125, 125*b* are coaxially arranged along the axis of rotation defined by the printer housing (e.g., hinge 105 as described in reference to the exemplary embodiment illustrated in FIGS. 3A and 3B).

In various embodiments, the bottom housing portion 120 of an exemplary printer device include one or more temporary fastening elements provided at the rear surface 122 thereof to facilitate an at least temporary arrangement of the printer housing in an open configuration. For example, as illustrated in FIG. 5, the exemplary bottom housing portion 120 may include a first temporary fastening element 126*a* and a second temporary fastening element 126*b* distributed along the rear surface 122. In various embodiments, the one or more temporary fastening elements 126*a*, 126*b* defined by, attached to, and/or imbedded within the rear surface 122 of the bottom housing portion 120 may be configured to engage one or more corresponding fastener elements defined by the top housing portion, as described herein with respect to the exemplary top housing portion illustrated in FIG. 4. For example, upon the top housing portion being opened (e.g., rotated about an axis of rotation defined by the hinge) to the open position, the temporary fastening elements 126*a*, 126*b* may be configured to engage a corresponding fastening element provided on the top housing portion via various mechanical fastening means, such as, for example, hook and loop fasteners, snaps, buttons, magnets, and/or the like, including any mechanism that may be used to facilitate the temporary and/or semi-permanent attachment and detachment of the bottom housing portion 120 relative to the top housing portion of the printer housing.

The one or more temporary fastening elements 126*a*, 126*b* may engage the corresponding one or more temporary fastening elements defined by the bottom housing portion (e.g., along the rear surface thereof) in order to at least partially secure the position of the top housing portion (e.g., the rear surface thereof) relative to the rear surface 122 of the bottom housing portion 120. As a non-limiting example, the first and second temporary fastening elements 126*a*, 126*b* may each embody magnets configured to be attracted to corresponding magnets (e.g., temporary fastener elements) provided at the rear surface of the top housing portion such that, upon the top housing portion being arranged in an open position, one or more attractive forces defined between the first and second temporary fastening elements 126*a*, 126*b* and the top housing portion (e.g., the corresponding magnets distributed about the rear surface thereof) causes the top housing portion to be retained in a position wherein the rear surface thereof is physically abutted against the rear surface 122 of the bottom housing portion 120.

In various embodiments, the bottom housing portion 120 may further comprise an alignment slot 127 disposed along the rear surface 122 thereof that is configured for engagement with a corresponding alignment feature defined by the top housing portion to align the top housing portion in an operable alignment relative to the bottom housing portion 120 as the top housing portion is rotated towards the open position. In various embodiments, the alignment slot 127 may embody an opening, an aperture, a material recess, and/or the like provided at the rear surface 122 and configured for receiving an alignment protrusion defined by the top housing portion therein. In various embodiments, the alignment slot 127 may be configured to receive at least a portion of an alignment protrusion provided disposed on the rear surface of the top housing portion as the rear surface approaches the rear surface 122 of the bottom housing portion 120. For example, the rotation of the top housing portion towards the open position may cause the alignment protrusion to be moved towards the rear surface 122 such that the alignment protrusion is at least partially inserted into the alignment slot 127. In various embodiments, the alignment slot 127 may be configured to receive at least a portion of an alignment protrusion therein to at least partially guide and/or redirect the movement of the top housing portion relative to the bottom housing portion 120 such that, upon the top housing portion being rotated to the open position, the top and bottom housing portions are positioned in an operably aligned arrangement relative to one another. As described herein, the alignment slot 127 may function to at least partially restrict the relative movement of the alignment protrusion disposed therein with respect to the bottom housing portion 120. Such an exemplary configuration may facilitate a repeatable arrangement of the printer housing in an open configuration in which the top housing portion and the bottom housing portion 120 (e.g., and the internal components attached to the respective housing portions) are properly aligned with one another to enable operation of the exemplary printer device, as described herein.

FIGS. 6A and 6B illustrate perspective views of an exemplary printer device with a printer housing provided in an open configuration in accordance with various embodiments described herein. In particular, FIGS. 6A and 6B illustrate an exemplary printer device 10 comprising a printer housing 100 provided in an open configuration with a chassis 140 operatively secured to a bottom housing portion 102 in a loading position and an operating position, respectively. As illustrated in FIG. 6A, the chassis 140 is secured relative to the bottom housing portion 120 via a hinged connection to the first chassis attachment element 141. In various embodiments, the chassis 140 may be configured to rotate about a hinge axis defined by the hinge element 141*a* to selectively configure the chassis 140 between a loading position and an operating condition. For example, FIG. 6A shows the chassis 140 in a loading position defined by the chassis 140 being rotated to an at least substantially upright (e.g., vertical) arrangement. In various embodiments, the chassis 104 may be selectively rotated to the loading position in order to facilitate the installation, loading, feeding, and/or other initial positioning of at least a portion of a media roll (e.g., a paper roll) along a media path (e.g., from the media roll secured within the media support assembly 130 to a media output defined along a front face of the printer device 10). For example, rotating the chassis 140 to the loading position may facilitate the feeding of the media roll into an operative position to facilitate the execution of a printing operation thereon.

Further, FIG. 6B shows the chassis 140 in an operating position defined by the chassis 140 being rotated from the loading position (e.g., as illustrated in FIG. 6A) in a counterclockwise rotational direction (e.g., as defined according to the exemplary orientation illustrated in FIGS. 6A and 6B) to an at least substantially horizontal arrangement. In various embodiments, the chassis 104 may be selectively rotated to the operating position in order to facilitate interaction between at least a portion of the ribbon assembly 150 (e.g., a ribbon 151) with the media roll provided along the media path. For example, the chassis 140 may be selectively arranged in an operating position such that the ribbon assembly 150 is moved to a position wherein the ribbon assembly 150 may be selectively actuated to interact with the print media in order to execute a printing operation, as described herein.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A printer device comprising:

a printer housing defining an interior portion configured for housing a plurality of internal printer components therein, the printer housing being selectively configurable in an open configuration to facilitate access to at least a portion of the plurality of internal printer components, wherein the printer housing comprises:

a bottom housing portion; and a top housing portion hingedly connected to the bottom housing portion via one or more hinge elements, the top housing portion being configured to rotate relative to the bottom housing portion about a hinge axis defined by the one or more hinge elements to selectively configure the printer housing between a closed configuration and the open configuration;

wherein the open configuration of the printer housing is defined at least in part by the top housing portion being arranged in a side-by-side arrangement relative to the bottom housing portion, wherein the plurality of internal printer components comprises a first internal printer component operatively secured to the bottom housing portion; and wherein the plurality of internal printer components further comprises a second internal printer component operatively secured to the top housing portion such that the second internal printer component is moved relative to the first internal printer component as the top housing portion rotates relative to the bottom housing portion, the second internal printer component defining a media support assembly configured to receive a media supply to at least partially define an arrangement of the media supply within the printer housing.

2. The printer device of claim 1, wherein the closed configuration of the printer housing is defined at least in part by a lower boundary edge of the top housing portion engaging an upper boundary edge of the bottom housing portion such that the top housing portion is positioned on top of the bottom housing portion.

3. The printer device of claim 2, wherein the open configuration of the printer housing is defined at least in part by the lower boundary edge of the top housing portion being disengaged from the upper boundary edge of the bottom housing portion and positioned such that both the lower boundary edge and the upper boundary edge are arranged to face in an at least partially upward vertical direction.

4. The printer device of claim 3, wherein, upon the printer housing being arranged in the closed configuration, the top housing portion and the bottom housing portion define an at least partially vertically stacked configuration relative to one another.

5. The printer device of claim 4, wherein the at least partially vertically stacked configuration defined by the top housing portion and the bottom housing portion is defined at least in part by the second internal printer component operatively secured to the top housing portion being positioned in vertically overlapping position relative to at least a portion of the first internal printer component operatively secured relative to the bottom housing portion.

6. The printer device of claim 3, wherein the closed configuration of the printer housing is further defined by a first rear surface of the top housing portion and a second rear surface of the bottom housing portion being arranged in an at least substantially coplanar configuration to collectively define an at least substantially vertical rear face of the printer housing.

7. The printer device of claim 1, wherein the plurality of internal printer components further includes a third internal printer component operatively secured to the top housing portion, the third internal printer component defining an internal user interface.

8. The printer device of claim 1, wherein the open configuration of the printer housing is defined at least in part by an engagement of a first rear surface of the top housing portion with a second rear surface of the bottom housing portion.

9. The printer device of claim 8, wherein the engagement of the first rear surface of the top housing portion with the second rear surface of the bottom housing portion is defined by the first rear surface physically contacting the second rear surface at a contact surface area to define an interface between the top housing portion and the bottom housing portion.

10. The printer device of claim 1, wherein the open configuration of the printer housing is defined at least in part by the top housing portion being arranged in a vertically inverted arrangement.

11. The printer device of claim 1, wherein the open configuration of the printer housing is further defined by a top surface of the top housing portion being arranged in an at least substantially coplanar configuration relative to a bottom surface of the bottom housing portion.

12. The printer device of claim 1, further comprising one or more fastener elements disposed about the printer housing and configured to facilitate a retention of the top housing portion in an open position in order to maintain the printer housing in the open configuration.

13. The printer device of claim 12, wherein the one or more fastener elements includes a first fastener element provided at a first rear surface of the top housing portion and a second fastener element provided at a second rear surface of the bottom housing portion, and wherein the first fastener element is configured for engagement with the second fastener element when the top housing portion is provided in the open position.

14. The printer device of claim 13, wherein the first fastener element and the second fastener element embody corresponding magnet components configured to define an attraction force therebetween to facilitate the retention of the top housing portion in the open position.

15. The printer device of claim 1, wherein the top housing portion is configured to rotate about the hinge axis between a closed position and an open position, wherein the closed configuration of the printer housing is defined at least in part by the top housing portion being arranged in the closed position, and wherein the open configuration of the printer housing is defined at least in part by the top housing portion being arranged in the open position.

16. The printer device of claim 15, wherein the top housing portion defines a range of relative rotational motion with respect to the bottom housing portion, the range of relative rotational motion being defined between the closed position and the open position.

17. The printer device of claim 16, wherein the range of relative rotational motion is defined by an angle of rotation of at least substantially 180 degrees.

18. The printer device of claim 1, wherein the first internal printer component operably secured relative to the bottom housing portion of the printer housing defines a chassis.

19. The printer device of claim 18, further comprising a ribbon assembly, wherein at least one portion of the ribbon assembly is attached to the chassis such that the chassis is configured to arrange the at least one portion of the ribbon assembly connected thereto within the printer housing.

* * * * *